Patented Dec. 22, 1931

1,837,228

UNITED STATES PATENT OFFICE

GEORGE A. LOWRY, OF NEW YORK, N. Y., ASSIGNOR, BY MESNE ASSIGNMENTS, TO FIBRE PROCESS & EQUIPMENT CORPORATION, OF WILMINGTON, DELAWARE, A CORPORATION OF DELAWARE

METHOD OF OBTAINING SPINNING FIBRE FROM UNRETTED PLANT STALKS AND ARTICLE OBTAINED THEREBY

No Drawing. Application filed November 3, 1928. Serial No. 317,124.

This invention relates to a method of obtaining spinning fibre (such as flax, hemp and the like of high quality) directly from its straw or from the plant stalks without first subjecting said fibre or plant stalks to a retting process.

The object of the invention accordingly is designed to produce a spinning fibre of high tensile strength and superior quality without subjecting to retting either the fibre bearing plant stalks or the fibre itself after the same has been scutched or freed from its woody content.

Another object includes the provision of a method for handling flax, hemp and similar fibre bearing plants from the time of harvesting to the point of spinning. The improved method materially decreases the period of time required heretofore for preparing the fibre for spinning.

A further object includes the production of long, fine, soft, silky flax spinning fibre of high tensile strength and light creamy color.

In preparing flax, for example, for spinning it has heretofore been deemed necessary to subject the fibre bearing stalk or its straw to a retting action and then dry the same before the fibre and woody structure of the plant can be separated. The essential steps of retting, drying and scutching flax have been practiced for many centuries and were known probably to the ancients. Certain improvements in retting have been proposed and much machinery has been devised for cleaning the retted fibre, that is scutching it.

Retting has, until now, been regarded as essential in producing good spinning fibre from, for example, flax or the like and prior to my invention it was, I believe, the only means for obtaining the high grade flax fibre such, for example, as is produced in the Courtrai District of Belgium. Retting, however, is a serious drawback to the raising and producing of flax fibre on account of the time element and labor involved and because fermentation due to retting pollutes the air as well as the water in the retting pools or streams. It is further of great importance that the retting process be properly timed and stopped at the right point since over retting weakens the fibre and increases the amount of "tow" or "codilla" produced in scutching, while under retting causes part of the gummy encrusting matter to be retained. This gummy hard matter later interferes with manufacturing operations and is undesirable for other reasons.

It is known that the ultimate fibre in flax is from one-half of and inch to one and one-quarter of an inch in length and that the fibres are laminated onto each other and held together by a gummy substance which constitutes the undesirable element in the spinning fibres. My process, I believe, dissolves and dilutes the gummy substance and removes the greater part thereof. A small portion of the diluted gums, no doubt, remains and helps to cement the laminated fibres together and thus producing a fibre of greater strength than that obtained by the best retting process.

It is known also that in order to have the laminated fibres or slivers separated and kept parallel to each other, and in order to get the fibres to separate easily from the woody core or from themselves the retting process has heretofore been deemed absolutely necessary.

I have found, however, that by removing the woody portion of the fibre bearing plant stalk, such as flax, hemp and the like, that the fibre can be successfully separated by my improved method without resorting to retting. I find also that fibre produced in accordance with my non-retting process yields long fibre of high quality which has a natural creamy color (unless previously discolored through poor handling), possesses high luster and smooth soft texture, and which can be hackled without much loss as tow. The fibre or sliver itself is of considerable length and is easily separated into finer fibres suitable for spinning fine fabric threads.

By the use of my invention it is also possible to obtain the seed and fibre from the unretted flax at the same time inasmuch as the straw can be thrashed and scutched when dry enough to stack. Moreover the unretted shives produced by the scutching of the straw have good food value for cattle and when mixed with the seeds the product is an excellent cattle food.

After the fibre has been separated from its woody core by any suitable means, that is the fibre is deshived, I then subject the unretted fibre to a solution containing a reagent and preferably an organic chemical reagent which acts upon the waxy constituents of the fibre and either removes or dissolves these sufficiently to leave the fibre in the desired condition for spinning. It is desirable and advantageous that the reagent chosen will act also as a mild bleaching medium whereby bleaching is easily effected either before or after spinning.

I have found as a most effective reagent for dissolving or acting upon the waxy constituents of the fibre and serving also as a mild bleaching agent a composition of a watery solution containing approximately from six per cent to twelve and one-half per cent, more or less, of glycerin in substantially clean and preferably, though not necessarily, soft water such as rain water, lake, or river waters not charged with carbonates or alkalies and minerals in solution. The scutched unretted flax or other fibre material is submerged in the glycerin solution at room temperature for a short period of time. I find that a twelve and one-half per cent glycerin solution requires a saturation period of about ten minutes, with a smaller percentage of glycerin a proportionally longer time of submerging is required. The fibre is next freed from its saturating solution in any suitable manner as by passing it through a wringer or by means of a centrifugal drier. It is then air dried and ready for the usual mechanical processes for producing the spinning thread.

I find that the flax fibre thus produced is of high grade and pronounced by experts to be equal to the best Courtrai in every respect with the additional advantage that the flax thus treated does not "nep", that is get into knotted tangles, and as a result there is much smaller loss in tow during the hackling process.

While, as stated above, I do not know what happens to the fibre as it undergoes my treatment, it is my impression, however, that the diluted glycerin dissolves and partially removes some or most of the gums, and that some of the dissolved gums remain in the fibre and assist in cementing or helping to cement the laminated fibres together. At any rate I find that fibre produced in accordance with my invention is of greater tensile strength than the best fibre produced by retting and it is difficult to account for increased tensile strength in any other way.

The percentage of glycerin named above gives the best results in the alloted time, but a larger percentage of glycerin can be used in the bath without injuring the fibre. It is found, however, that if too much glycerin is used the fibre retains a damp feeling and there is more loss in hackling than when the proper amount is used. Care should also be taken not to leave the fibre in the bath too long as that may act disadvantageously in some instances. Instead of glycerin I find that other members of the higher alcohols may be used, such as di-ethylene glycol, tri-methyleneglycol, glycerol and the like. I find, however, that the glycerin is the most satisfactory reagent as it is comparatively cheap and can be used advantageously at ordinary, that is, at room temperature.

In some instances I find it of advantage to wash the freshly scutched fibre with clear water. I find that if the fibre has been properly scutched, that is, thoroughly cleaned of its extraneous matter and woody content, water will act and assist in removing some of the objectionable coloring matter and other ingredients. With the addition of glycerin the action of the water is greatly improved and when subjected to my process as outlined above I find that the washing step will be of material assistance in producing a clean high grade fibre.

Having now described my invention, what I claim as new and useful and desire to secure by United States Letters Patent is:

1. The method of obtaining fibre from fibre bearing plants without retting, which comprises removing the woody core from the fibre, then submerging said fibre in a saturating liquid containing glycerin, then freeing said fibre from substantially all of said saturating liquid, and finally drying said unretted fibre.

2. The method of obtaining spinning fibre from unretted fibre yielding plant stalks, which comprises separating the fibre from its woody core, then subjecting said fibre to the action of a solution containing glycerin, then removing said glycerin containing solution from said fibre and drying the same.

3. The method of obtaining spinning fibre from unretted fibre yielding plant stalks, which comprises breaking the core of the unretted plant stalks into short lengths or shives, then freeing the unretted fibre from the shives, then saturating said fibre with a watery solution of glycerin, then squeezing said fibre and drying the same.

4. The method of obtaining spinning fibre from unretted fibre yielding plant stalks, which comprises breaking the core of the unretted plant stalks into short lengths or shives, then freeing the unretted fibre from the shives, then saturating said fibre with a watery solution containing an inorganic solvent of the gummy constituent of the unretted fibre, then squeezing said fibre and drying the same in preparation for heckling and spinning.

5. The method of obtaining spinning fibre from unretted fibre yielding straws, which comprises harvesting said straws and scutching the same unretted, then immersing said scutched unretted fibre from ten to twenty minutes in a dilute solution of glycerin, and then freeing the fibre from said solution.

6. The method of obtaining spinning fibre from unretted fibre yielding flax straws, which comprises scutching said straws unretted to obtain unretted fibre, then subjecting said unretted fibre to a watery solution containing a percentage of glycerin sufficient to soften the fibre in approximately fifteen minutes, and then eliminating substantially all of the solution from said fibre.

7. The method of obtaining spinning fibre from unretted fibre yielding flax straws, which comprises scutching said straws unretted to obtain unretted fibre, then subjecting said unretted fibre to a watery solution containing approximately twelve and one-half per cent of glycerin for a period of time sufficient to disintegrate the gums in the fibre, and then squeezing said fibre and drying the same.

8. That method of treating unretted flax straws to obtain spinning flax therefrom, which comprises scutching said unretted straws, then immersing the scutched fibre thus obtained in a watery solution containing an organic gum solvent devoid of an alkali, then wringing said fibre and drying it in preparation for heckling.

9. That method of treating unretted flax straws to obtain spinning flax therefrom, which comprises scutching said unretted straws, then immersing the scutched fibre in a dilute solution of glycerin for approximately fifteen minutes and thereafter wringing the fibre and drying it.

10. That method of treating unretted flax straws to obtain spinning flax therefrom, which comprises scutching said unretted straws, then washing said scutched flax, then immersing said washed fibre in a solution containing from four to twelve per cent of glycerin, then separating the solution from the fibre and drying the same.

11. That method of obtaining spinning fibre from unretted fibre yielding stalks, which comprises scutching said stalks unretted to obtain unretted fibre substantially freed from its woody constituents, then washing said fibre in water, then immersing said fibre in a glycerin containing solution free from an alkali and finally wringing and drying said fibre.

12. The method of treating unretted fibre which comprises washing said fibre in a solution of glycerin containing no alkali reagent, then freeing said fibre from said solution and drying said fibre.

13. The method of treating unretted fibre which comprises deshiving said fibre, then washing the same in a solution containing approximately twelve per cent of glycerin, then freeing said fibre from said solution and drying the said fibre.

14. The method of treating unretted flax which comprises threshing and scutching said flax to obtain deshived unretted fibre, then washing said fibre in a solution containing less than fifteen per cent of glycerin devoid of an alkali, then freeing said fibre from said solution and drying said fibre.

15. As an article of manufacture, an unretted spinning fibre according to claim 14 and characterized by its sheen, light creamy color, its soft texture and its high tensile strength.

16. As an article of manufacture, an unretted spinning flax fibre according to claim 12 and characterized by its sheen, creamy color, its soft texture, its high tensile strength, and smoothness of individual strands.

17. As an article of manufacture, an unretted spinning fibre prepared in accordance with the steps of claim 12 and characterized by its sheen, creamy color, its high tensile strength, and laminated long fibre strands.

18. That method of obtaining fibre from fibre bearing plants without retting which comprises removing the woody core from the fibre, then submitting said fibre to the action of a gum dissolving liquid, then freeing said fibre substantially from said gum dissolving liquid and finally drying said fibre in preparation for heckling and spinning.

19. That method of preparing fibre for spinning which comprises thrashing and scutching the unretted fibre, then submitting said fibre to the action of a gum dissolving liquid, containing approximately 15% of glycerine, then washing said fibre and drying the same.

20. The method of preparing flax fibre and the like for spinning which comprises scutching the fibre to remove the woody core, then retting, that is submitting the scutched fibre to the action of a gum dissolving liquid, and then heckling said fibre for spinning.

In testimony whereof I have hereunto set my hand on this 31st day of October, A. D. 1928.

GEORGE A. LOWRY.